June 6, 1933.  C. E. PLOEGER  1,912,463
UNLOADER VALVE
Filed July 14, 1931
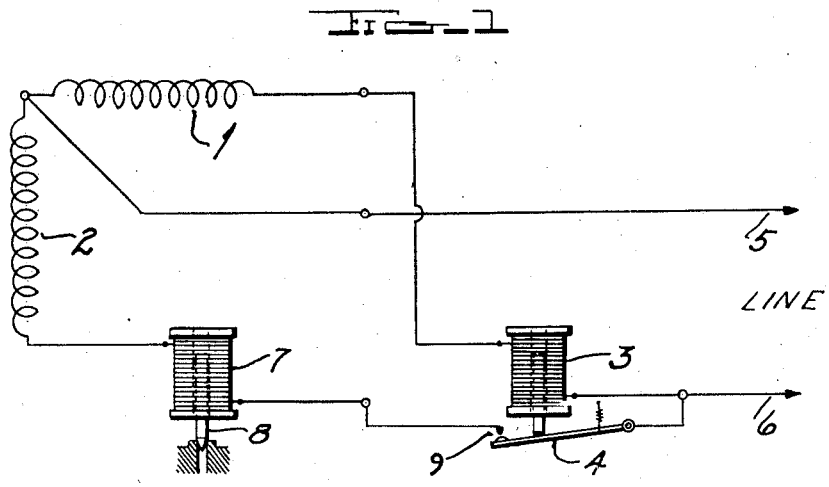
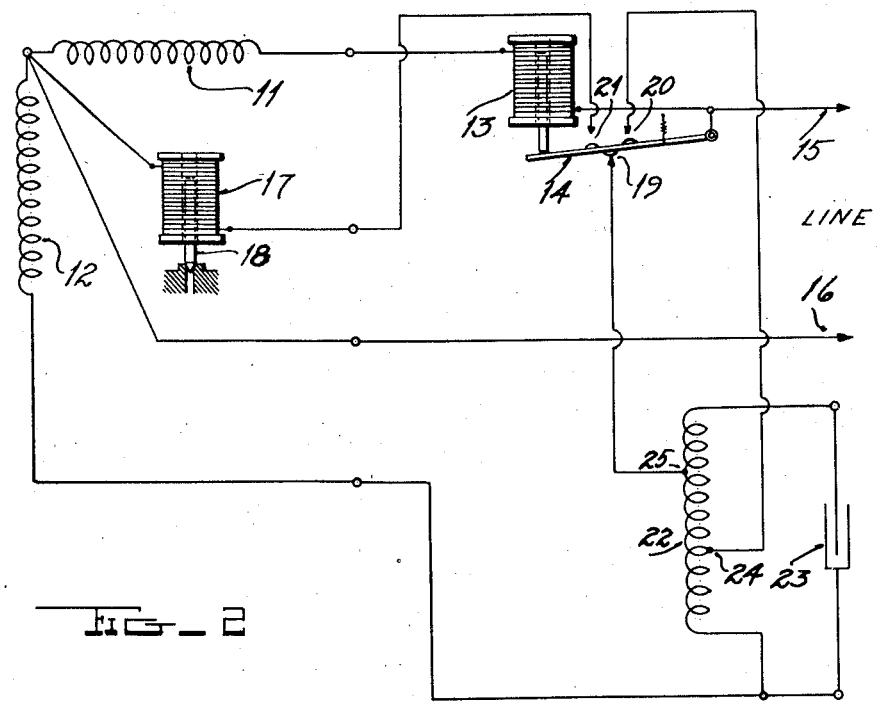
INVENTOR.
Clyde E. Ploeger
BY
ATTORNEY.

Patented June 6, 1933

1,912,463

UNITED STATES PATENT OFFICE

CLYDE E. PLOEGER, OF EVANSVILLE, INDIANA, ASSIGNOR TO SERVEL, INC., OF NEW YORK, N. Y., A CORPORATION OF DELAWARE

UNLOADER VALVE

REISSUED

Application filed July 14, 1931. Serial No. 550,643.

This invention relates to unloaders for electric motors and more particularly to automatic control of an unloading device by electromagnetic means in the starting circuit of an electric motor.

An object of this invention is to provide an electromagnetic device in the starting circuit of a single phase motor for relieving the latter of its load during the starting period. In a compressor driven by an electric motor as in the condensing unit of compression type refrigerating apparatus, it is desirable to relieve the compressor load during the starting period of the driving motor and this is usually accomplished by providing a normally closed pressure relief or unloading valve on the discharge side of the compressor which is opened during the starting period, that is until the driving motor reaches its normal running speed.

In accordance with this invention a single phase induction motor is provided with an electromagnetic device in the motor circuit which is connected to open an unloading valve on the compressor to relieve the load during the starting period of the motor. In one embodiment of this invention a solenoid is arranged to open an unloading valve and is connected in series with the starting winding of a single phase motor, whereby the solenoid is energized to open the valve when the starting winding circuit is closed by any well known means such as a relay in the main or running winding circuit. This invention is also applicable to a capacitor type single phase motor, in which application the electromagnetic unloading device is connected to be energized when the connections to the phase shifting circuit are changed upon operation of a relay which is connected in the main or running winding circuit of the motor.

This invention will be more fully understood by reference to the following description taken in connection with the accompanying drawing wherein Fig. 1 is a diagram of connections showing this invention applied to a single phase induction motor of the split phase starting type; and Fig. 2 is a diagram of connections showing this invention applied to a single phase induction motor of the capacitor type.

In Fig. 1 of the drawing reference numeral 1 designates the running winding of a single phase alternating current motor. One end of the starting winding 2 is connected to the running winding 1 and the line 5 of the source of current supply. The relay solenoid 3 is connected in series with the motor winding 1 and the current supply line 6. The armature 4 which is operatively associated with the relay solenoid 3 is also connected to the line and a normally open contact 9 which is associated with this armature is connected to the winding 7 of an electromagnetically operated load-relieving apparatus. The winding 7 is connected in series with the starting winding 2 of the motor.

In operation, the initial current flow through the running winding 1 and the solenoid 3 is relatively large and causes the solenoid 3 to lift the armature 4, whereupon the contact 9 is closed and the circuit between the starting winding 2 of the motor and the line 5—6 is completed. A relatively large initial current also flows through the winding 2. The solenoid 7, which is connected in series with the winding 2, lifts the valve 8 and thereupon relieves the load on the motor until the solenoid 7 is deenergized which occurs when the current through the motor winding 1 decreases to the normal or running value and the magnetic field set up by this current in the solenoid 3 is of insufficient intensity to retain the armature 4.

The valve 5 may, by way of example, be positioned on the discharge side of a compressor which is operated by the motor. This valve is maintained closed by its own weight and atmospheric pressure acting upon it. Additional springs bearing down upon this valve may also be provided when it is employed in positions where forces of gravity would tend to maintain it in open position.

In Fig. 2 of the drawing another form of this invention in which the main winding 11 of a capacitor type of alternating current single phase motor is connected in series with the relay winding 13 across the source of current supply lines 15—16. The capacitor winding 12 of the motor is connected directly to the winding 11 and the line 16. The armature 14, which is operatively associated with the solenoid 13, is connected directly to the line 15. One of the contacts 21 of the relay armature 14 is connected in series with the load-relieving solenoid 17 and the common connection of the motor windings 11 and 12 and the line 16. One of the contacts 19 of the armature 14 is connected at tap 25 of the inductance 22 which, together with the condenser 23, forms the phase-shifting circuit. Tap 24 of the inductance 22 is connected to one of the contacts 20. A connection is also provided between the capacitor winding 12 and the phase-shifting circuit which includes inductance 22 and condenser 23.

The contacts 20 and 21 are closed when the circuit between the lines 15 and 16 and the winding 11 of the motor is established for starting the motor, since the initial current flow through the solenoid 13 is relatively large and the magnetic field set up by this current in the magnetic circuit of this solenoid is sufficient to lift the armature 14. The solenoid 17 is thus connected across the source of current supply lines 15 and 16 and the capacitor winding 12 is connected through the point 24 of the inductance 22 and the contacts 20 to the line 15. The circuit between the contacts 19 and the tap 25 of the inductance 22 is simultaneously broken.

When the solenoid 17 is connected to the lines 15 and 16 the valve 18, which is connected into the low pressure side of a gas compressor, is opened electromagnetically and the motor, with which the windings 11 and 12 are operatively associated, is relieved of its gas compressor or similar load. At the same time the line 15 connected to the inductance 22 is shifted from point 25 to point 24. This causes a substantial shift in the phase relation between the current energizing winding 12 and the current energizing winding 11. A rotating electromagnetic field is thus set up in the motor windings for the purpose of starting the motor. After the motor attains a certain speed the line current through the solenoid 13 and the winding 11 decreases to a lower value and the armature 14 is released, inasmuch as this armature is adjusted to require a relatively large magnetic force, such as is set up in the solenoid by the motor starting current, to retain it in its upper position. The contacts 19 are then closed and the phase-shifting circuit 22, 23 connected as adjusted for running conditions.

It will be obvious to those skilled in the art that various other changes may be made in the construction and arrangement without departing from the spirit of the invention and therefore the invention is not limited to what is described in the specification and shown in the claims but only as indicated in the appended drawing.

I claim:

1. In combination, an electric motor having a running winding and a phase-distorting winding arranged to be energized from a source of current supply, solenoids connected in series with said windings, one of said solenoids being connected to close the circuit of said phase-distorting winding for starting said motor and means associated with the other of said solenoids for relieving the load of said motor during starting.

2. In combination, an electric motor adapted for operation from a single phase alternating current source of supply, running and starting windings operatively associated with said motor, solenoids connected in series with said windings, one of said solenoids being connected to control the circuit of said starting winding during the starting of said motor and a valve controlled by the other of said solenoids, said last mentioned solenoid being arranged to operate said valve to relieve said motor of its load during starting.

3. In combination, a single phase alternating current motor having a plurality of windings, one of said windings being a main running winding, a relay connected in series with said main running winding, a solenoid connected in series with another of said motor windings, load-relieving means operable by said solenoid, said relay being connected to close the circuit of said solenoid and a source of current supply during the starting of said motor whereby said solenoid is energized and caused to operate said load-relieving means for substantially relieving the motor of its load.

4. An automatic load control device for electric motors having a starting circuit and a running circuit, a solenoid connected into said running circuit, circuit closing means operatively associated with said solenoid, said solenoid being adjusted to operate said circuit closing means only during the starting of said motor, connections between said circuit closing means and said starting winding whereby said starting winding is connected into circuit through the operation of said solenoid, a solenoid connected in series with said starting winding and an unloader valve operatively associated with said last mentioned solenoid, said unloader valve being arranged to relieve the load from said motor during the energization of said starting winding.

In testimony whereof, I affix my signature.

CLYDE E. PLOEGER.